No. 660,971. Patented Oct. 30, 1900.
J. E. RUBY.
BICYCLE.
(Application filed May 21, 1900.)
(No Model.)

Witnesses

Inventor
James E. Ruby,
By Victor J. Evans.
Attorney

UNITED STATES PATENT OFFICE.

JAMES E. RUBY, OF COSBY, MISSOURI.

BICYCLE.

SPECIFICATION forming part of Letters Patent No. 660,971, dated October 30, 1900.

Application filed May 21, 1900. Serial No. 17,381. (No model.)

*To all whom it may concern:*

Be it known that I, JAMES E. RUBY, a citizen of the United States, residing at Cosby, in the county of Andrew and State of Missouri, have invented certain new and useful Improvements in Bicycles, of which the following is a specification.

This invention relates to bicycles, but more particularly to an auxiliary propelling means therefor.

The object of the invention is to provide an efficient motor adapted to accumulate power supplied by the impetus of the bicycle or vehicle to which it is attached and to supply this power to the bicycle or other vehicle at such convenient times as will be found most desirable.

In descending hills on bicycles much inconvenience usually results, owing to the fact that the rider finds difficulty in controlling his "mount" and frequently is compelled to walk, unless the "wheel" is supplied with some form of brake. The device which I consider novel will in a measure retard the speed of the wheel when the component parts are properly arranged and at the same time store sufficient power to assist the rider in propelling the wheel up an inclined grade. The peculiar manner of accomplishing the desired result, as well as the construction of the novel parts, will be clearly disclosed in the following description and recited in the annexed claims.

Figure 1:
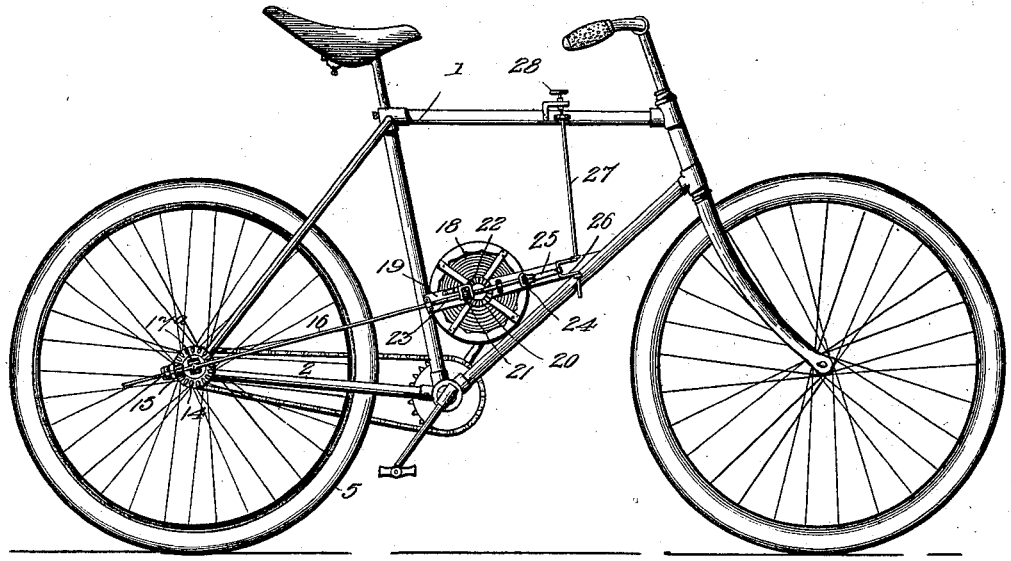
Figure 2:
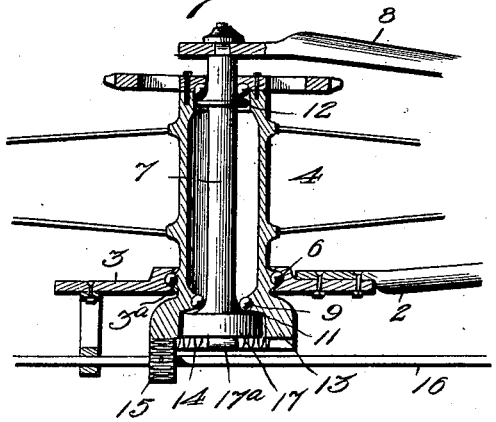
Figure 3:
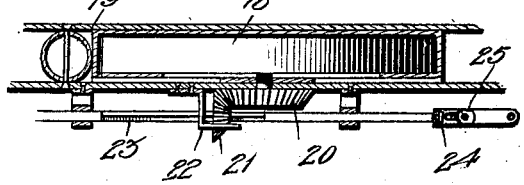

In the drawings, Figure 1 represents a side elevation of a bicycle to which my motor is attached. Fig. 2 is a fragmentary sectional view taken through the hub of the rear wheel; and Fig. 3 is a similar view on the line 3 3 of Fig. 1, illustrating the motor and the driving-shaft.

In carrying out my invention the usual plan of constructing the bicycle *per se* will practically be carried out. However, a slight change will be made in the arrangement of the hub of the rear wheel and in the manner of attaching the same.

1 designates the bicycle, provided with the usual accessories. The rear fork 2 of the frame is modified to admit of an additional extension 3, having an opening $3^a$, in which is rotatably secured the hub 4 of the rear wheel 5. This hub is supported upon a plurality of antifriction-balls 6, which are positioned in raceways in the hub and extension 3.

7 designates the axle, which is rigidly connected to the rear fork 8 and on which is sleeved the hub 4, carrying balls in the cups 9 and 10, which travel on the cones 11 and 12 of the axle. The end of the hub which projects through the opening $3^a$ is provided with a crown-head 13, provided with the teeth or gears 14, which mesh with the teeth on the pinion 15, carried by the driving rod or shaft 16, the purpose of which will be apparent hereinafter. Within the head 13 and rigidly connected to the axle 7 is a disk or head 17, carrying a plurality of straight parallel ribs or teeth $17^a$, to be engaged by the pinion 15 when it is desired to throw the motor out of engagement with the rear wheel, and thus prevent either its supplying power or receiving it.

18 designates the spring-motor, having a suitable case 19 and connected to the bicycle-frame in any convenient manner. The bevel-gear 20, which is adapted to wind the spring-motor and be driven by it, is carried by the case 19 and meshes with a similar gear 21, loosely mounted on the drive-shaft 16 and constantly held in mesh with the gear 20 by the forked bearing 22, which is also carried by the case 19. It will be noticed that the shaft 16 is rectangular in cross-section for a portion of its length to form an angular spline 23, which is adapted to slide back and forth in a corresponding keyway in the gear 21, which it carries. The anterior end of the shaft 16 is provided with a head 24, which is swiveled in the link connection 25, connected to the cam or offset 26 of the rod 27, suitably positioned on the frame and provided with a hand-wheel 28 within easy reach of the rider, whereby the entire device will be under his control.

Under ordinary conditions the pinion 15 will be in engagement with the ribs $17^a$ on the rigid axle 7, and the shaft 16 will be thereby held against rotation. However, should it be found desirable to store up power—as, for instance, when descending a hill or other incline—the hand-wheel 28 can be operated to rotate the rod 27 and swing the cam 26 around to the position shown in Fig. 1. The rotation of the rear wheel will drive the pinion 15, which in turn will rotate the shaft 16. The pinion 21 being mounted upon the spline of the shaft 16 will be caused to rotate, imparting motion to the gear 20, which will wind up the spring-motor 18. When the motor is wound sufficiently, the pinion 15 will be thrown in engagement with the ribs 17ª until such time as the auxiliary power is required. In ascending a hill or at any other convenient time the pinion 15 will be thrown into engagement with the crown-head 13 at a point diametrically opposite that shown in Fig. 1, and as the spring of the motor unwinds additional power will be given to the bicycle other than that resulting from the rotation of the sprocket-wheels rotated by the cranks.

It is of course obvious that the auxiliary power may be stored by the rider when speeding along any convenient stretch of level road as well as in descending hills.

Although I have specifically described the most desirable manner of accomplishing the desired result, I would have it understood that I do not limit myself to the exact details shown, but reserve the right to make such slight changes and alterations as would suggest themselves to the ordinary mechanic without departing from the spirit of this invention.

I claim—

1. The combination with a bicycle, the hub of the rear wheel of which is provided with a crown-head; of a spring-motor carried by the frame of the bicycle and provided with a gear, a driving-shaft also carried by the frame, a gear thereon constantly in mesh with the gear of the motor, and a pinion also on said shaft adapted to be thrown into and out of contact with different portions of the crown-head, so that the motor can be wound thereby and the unwinding of the motor will be adapted to rotate the hub always in the same direction.

2. The combination with a bicycle; of a crown-head on the hub of the rear wheel thereof, a spring-motor on the bicycle-frame, a drive-shaft having a gear in connection with said motor, a pinion on the shaft, movable at will into and out of mesh with different parts of the crown-head to wind the motor, and means carried by the axle of the rear wheel to engage the pinion and prevent its rotation.

3. The combination with a bicycle; of a crown-head on the rear wheel thereof, a spring-motor carried by the bicycle-frame, a drive-shaft, a gear thereon engaging a similar gear on the motor, a pinion also on said shaft and adapted to engage the crown-head when the motor is unwinding, and a series of ribs carried by the axle of the said hub to be engaged by the pinion to prevent the unwinding of the motor.

4. In a device of the character described, the combination with a bicycle the hub of the rear wheel of which is provided with integral gear, of a spring-motor carried by the bicycle-frame, a pinion adapted to be operated thereby and having an angular opening, an operating-shaft also carried by the frame and provided with an angular spline reciprocating in the opening in the pinion, a second pinion rigidly mounted on the shaft and designed to engage the gear on the hub, and an operating device connected to one end of the shaft whereby the second pinion may be thrown in engagement with the gear on the hub to wind the spring and be shifted to a point diametrically opposite to the point of engagement to operate the rear wheel in a forward direction when the spring unwinds.

In testimony whereof I affix my signature in presence of two witnesses.

JAMES E. RUBY.

Witnesses:
H. M. THOMAS,
JOHN RUBY.